US008267772B2

(12) United States Patent
Isaac et al.

(10) Patent No.: US 8,267,772 B2
(45) **Date of Patent: *Sep. 18, 2012**

(54) GAMING MACHINES HAVING RHYTHMIC REELS

(75) Inventors: Benjamin Isaac, Las Vegas, NV (US); John Kenneth Kearns, Henderson, NV (US); Lawrence C. McAllister, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/271,585

(22) Filed: Oct. 12, 2011

(65) Prior Publication Data

US 2012/0028699 A1 Feb. 2, 2012

Related U.S. Application Data

(63) Continuation of application No. 11/217,862, filed on Aug. 31, 2005, now Pat. No. 8,047,910.

(51) Int. Cl.
*A63F 9/24* (2006.01)
*A63F 13/00* (2006.01)

(52) U.S. Cl. .......................... 463/20; 463/16; 273/143 R

(58) Field of Classification Search .......... 463/1, 16–20, 463/25, 29–31; 273/138.1, 139, 143 R
See application file for complete search history.

(56) References Cited

U.S. PATENT DOCUMENTS

| | | | | |
|---|---|---|---|---|
| 4,299,388 | A * | 11/1981 | Resch et al. | 463/20 |
| 4,373,727 | A | 2/1983 | Hooker et al. | |
| 4,433,844 | A | 2/1984 | Hooker et al. | |
| 4,911,449 | A * | 3/1990 | Dickinson et al. | 463/20 |
| 5,667,219 | A | 9/1997 | Ishibashi | |
| 5,813,511 | A * | 9/1998 | Takemoto et al. | 194/217 |
| 5,934,672 | A | 8/1999 | Sines et al. | |
| 6,110,041 | A | 8/2000 | Walker et al. | |
| 6,471,588 | B2 | 10/2002 | Sakamoto | |
| 7,360,761 | B2 | 4/2008 | Durham et al. | |
| 7,727,066 | B2 | 6/2010 | Ikeya et al. | |
| 7,740,534 | B2 | 6/2010 | Walker et al. | |
| 8,047,910 | B2 * | 11/2011 | Isaac et al. | 463/20 |
| 2003/0003988 | A1 | 1/2003 | Walker et al. | |
| 2003/0162586 | A1 | 8/2003 | Ikeya et al. | |
| 2003/0232640 | A1 | 12/2003 | Walker et al. | |
| 2004/0033828 | A1 | 2/2004 | Gagner | |
| 2004/0224752 | A1 * | 11/2004 | Nireki et al. | 463/20 |
| 2005/0096122 | A1 | 5/2005 | Nireki et al. | |

(Continued)

FOREIGN PATENT DOCUMENTS

GB 2100492 A * 12/1982

(Continued)

*Primary Examiner* — Milap Shah
(74) *Attorney, Agent, or Firm* — Steptoe & Johnson LLP

(57) ABSTRACT

A gaming machine and methods for independently controlling the movement of each mechanical reel are disclosed. The gaming machine includes a plurality of mechanical reels each having indicia provided on an outer surface of each of the reels. A game controller generates a game outcome and determines a spin duration for each of the plurality of reels. One or more stepper motors are operatively coupled to the mechanical reels to independently spin each reel. A reel control unit is in communication with one or more stepper motors and the game controller. The reel control unit determines an appropriate spin profile for each reel based upon the game outcome and the spin duration to cause the reels to spin and stop in a rhythmic manner.

19 Claims, 4 Drawing Sheets

U.S. PATENT DOCUMENTS

| | | | |
|---|---|---|---|
| 2005/0181861 A1 | 8/2005 | Kodachi | |
| 2005/0285337 A1 | 12/2005 | Durham et al. | |
| 2006/0148553 A1 | 7/2006 | Dodge | |
| 2007/0178959 A1 | 8/2007 | Halprin | |
| 2008/0096636 A1 | 4/2008 | Power | |
| 2008/0113749 A1 | 5/2008 | Williams et al. | |
| 2009/0275382 A1 * | 11/2009 | Vallejo et al. | 463/20 |
| 2011/0065492 A1 | 3/2011 | Acres | |

FOREIGN PATENT DOCUMENTS

| | | |
|---|---|---|
| JP | 2001276319 A | 10/2001 |

* cited by examiner

GAMING MACHINES HAVING RHYTHMIC REELS

RELATED APPLICATIONS

This application is a continuation of U.S. patent application Ser. No. 11/217,862, filed Aug. 31, 2005, entitled GAMING MACHINES HAVING RHYTHMIC REELS, which is hereby incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

Embodiments disclosed herein relate generally to gaming machines having rhythmic reels.

BACKGROUND

Gaming machines have been developed having various features to capture and maintain player interest. Traditionally, gaming machines garner player interest by providing the player with the opportunity to win cash awards based upon a player's wager. Accordingly, various types of games or game features have been developed to provide players with the opportunity to win large sums of money for a small wager. For example, games may include one or more bonus games or the opportunity to win progressive jackpots in order to maintain player interest.

Additionally, over the years, gaming machines have grown in sophistication and features to maintain player interest. For example, the mechanical reels of traditional gaming machines have been replaced with video depictions of spinning reels. These video gaming machines provide a richer gaming experience for players by including graphics or animation as part of the game. Nevertheless, mechanical gaming machines continue to be successful even though there are physical limitations as to the features that may be provided on a mechanical gaming machine. For example, symbols on the mechanical reels are located at fixed positions on the reels so that the symbols cannot be readily moved or animated. Accordingly, there is a continuing need for slot machine variants that provide a player with enhanced excitement without departing from the original slot machine gaming concept.

SUMMARY

Briefly, and in general terms, various embodiments are directed to gaming machines having mechanical reels having variable spin rates in order to provide rhythmic effects. In one embodiment, the rhythmic effect is stopping the reels at predetermined intervals. In another embodiment, the rhythmic effect is the result of increasing the spin duration of subsequent reels to generate player anticipation. In yet another embodiment, the rhythmic effect is stopping all the mechanical reels at approximately the same time.

In one embodiment, a method is disclosed for independently controlling the movement of each of a plurality of mechanical reels in a gaming machine. The method includes: activating a game on a gaming machine, the game machine having at least a first reel, a second reel, and a third reel, wherein each of the reels includes an outer edge having indicia displayed thereon; generating a game outcome, wherein the game outcome dictates a particular final position for the first reel, second reel and third reel; receiving player input selecting an overall duration of the game; determining a spin profile for each of the plurality of reels based upon the game outcome and spin duration, wherein the spin profile causes each of the plurality of reels to stop such that a first time interval interposed between a first stopping reel and a second stopping reel is shorter than a second time interval interposed between the second stopping reel and a third stopping reel when the game outcome is a winning outcome; initiating spinning of the first reel, second reel, and third reel substantially at a same time, wherein the first reel, second reel, and the third reel are spun according to the corresponding spin profile; and stopping each of the reels at the final position according to the spin profile.

Another method is directed to controlling the movement of each mechanical reel in a gaming machine. This method includes: providing a plurality of mechanical reels each having indicia provided on an outer surface of each of the reels; generating a game outcome and determining a spin duration for each of the plurality of reels using a game controller; receiving player input selecting an overall game duration using a player-input device; independently spinning each reel using stepper motors, wherein the one or more stepper motors are operatively coupled to the mechanical reels; and determining a spin profile for each reel based upon the game outcome and the spin duration using the reel control unit, wherein a reel control unit is in communication with the one or more stepper motors and the game controller, and wherein the spin profile causes each of the plurality of reels to stop.

In still another method, the movement of each reel in a gaming machine is controlled to synchronize the stopping of the reels. The gaming machine includes a plurality of mechanical reels having indicia provided on an outer surface of each of the reels. A game outcome is generated that dictates the final position of each reel and a particular spin duration for each reel. An appropriate spin profile for achieving the game outcome for each reel is determined and is based upon the current position of each reel, the desired final position of each reel, and a particular spin duration. Each of the reels is then spun according to the spin profile and synchronized. Once synchronized, the reels are stopped substantially simultaneously to depict the combination of indicia corresponding to the game outcome.

Other features and advantages will become apparent from the following detailed description, taken in conjunction with the accompanying drawings, which illustrate by way of example, the features of the various embodiments.

DETAILED DESCRIPTION

Various embodiments disclosed herein are directed to gaming machines and methods for independently controlling the movement of each of the mechanical reels to enhance the gaming experience of the player. More specifically, the rotational velocity of each mechanical reel may be varied so that each reel may be stopped after a controlled period of time. As a result, the reels may be controlled to produce patterned and non-patterned reel movements. For example, patterned reel movements may include rhythmic reel effects. In one embodiment, the rhythmic effects are the result of having a substantially similar time interval interposed between each stopping reel. Rhythmic effects may also be the result of increasing or decreasing the time interval interposed between each stopping reel. In other embodiments, the rhythmic effects are the result of synchronizing the reel stops with music and/or to a simple tempo. Additionally, the rhythmic effects include synchronizing and simultaneously stopping all the reels.

Figure 1:
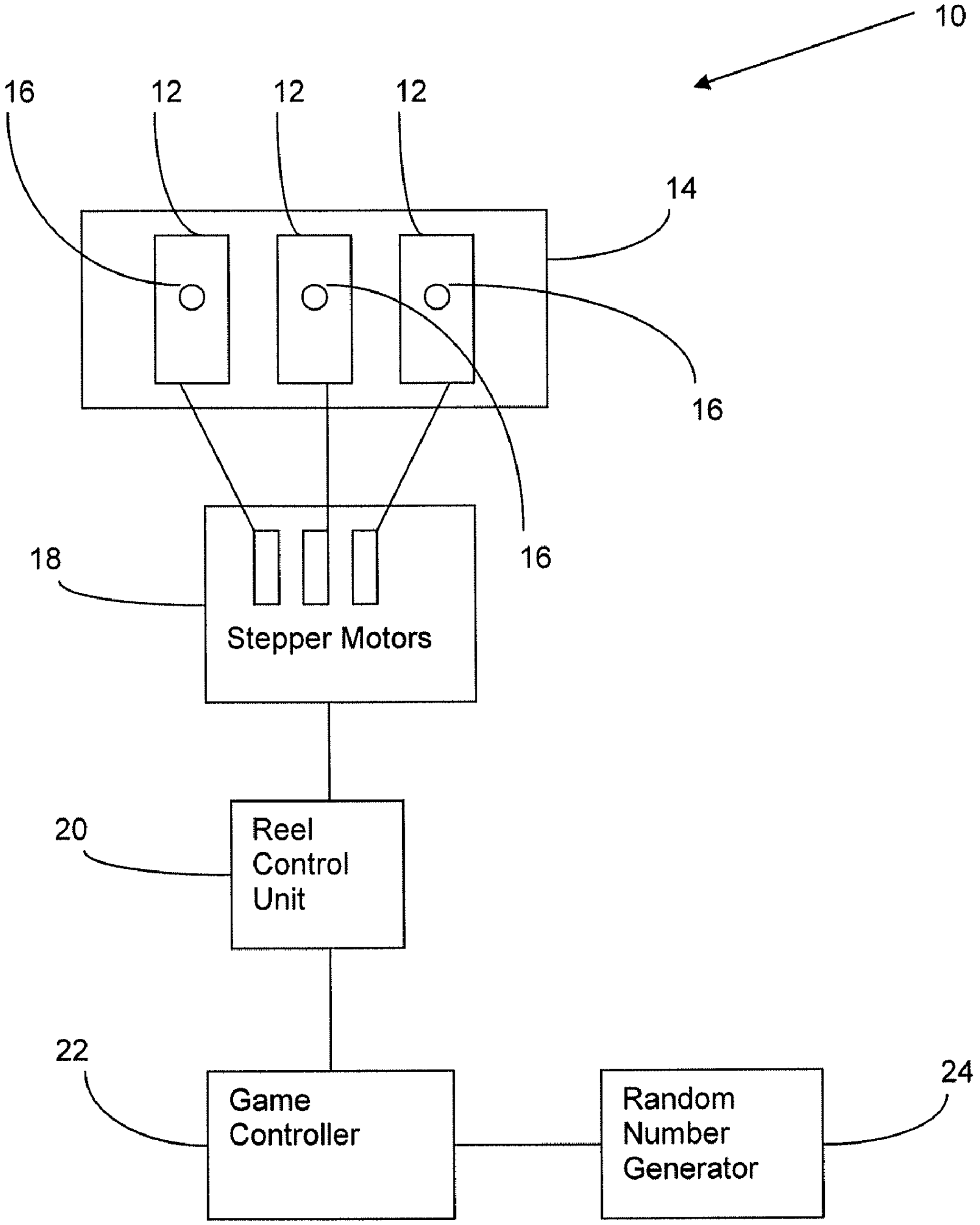
FIG. 1 is a schematic view of one embodiment of a gaming machine having rhythmic reels.

Referring now to the drawings, wherein like reference numerals denote like or corresponding parts throughout the drawings, and more particularly to FIGS. 1-4, there are shown various embodiments of a gaming machine having rhythmic reels. Specifically, FIG. 1 schematically illustrates the various functional units of one embodiment of the gaming machine 10. As shown in FIG. 1, the gaming machine 10 includes three mechanical reels 12 housed in a display area 14. Additionally, one or more indicia 16 are provided on the outer surface of each mechanical reel 12. The gaming machine 10 also includes stepper motors 18, wherein one stepper motor is connected to one reel 12. As those skilled in the art will appreciate, the gaming device 10 may include additional stepper motors 18. Alternatively, in another embodiment, the gaming machine 10 may have fewer stepper motors 18 than reels 12. The gaming device 10 also includes a reel control unit (RCU) 20, and a game controller 22. As those skilled in the art will appreciate, other embodiments of the gaming machine 10 may have any number of mechanical reels 12. For example, in one embodiment, the gaming machine 10 may have five mechanical reels.

As shown in FIG. 1, the reels 12 are operatively coupled to stepper motors 18. The stepper motors 18 are responsible for spinning and stopping the reels 12. Each reel spin is comprised of a specific number of motor steps having a fixed time duration that operates the motor to achieve a fixed angle of rotation. During acceleration of the reels 12, the motor steps generally progress from a long duration to a short duration. When the reels 12 are travelling at their final velocity, all the motor steps are of the same duration. During deceleration, the motor steps generally progress from a short duration to a long duration until the motor comes to a stop.

The stepper motors 18 of the gaming machine 10 are controlled and monitored by the RCU 20. More specifically, the RCU 20 is responsible for determining the spin profile for each reel 12. In order to determine the appropriate spin profile, the RCU 20 calculates the distance between the current and final position of each reel. Based upon the spin distance and the desired spin duration of each reel, the RCU 20 then determines a spin profile for each reel 12.

The spin profiles provide the stepper motors 18 with the number and duration of motor steps for each reel spin phase. The reel spin phase includes an acceleration phase, a steady-state phase, and a deceleration phase. Optionally, the spin profile may include an adjustment phase. The adjustment phase includes one or more reel revolutions. The overall spin duration of the reels 12 can be calculated by summing the durations of each motor step during the different reel spin phases. The acceleration phase includes the rate and duration of the acceleration of the reel to a final velocity. The final velocity of the reel is maintained during the steady-state phase. The deceleration phase includes the rate and duration of deceleration of the reel to the stop position. The adjustment phase includes any additional reel revolutions required to provide the desired spin duration and/or to assure that the reels 12 stop in a particular sequence.

In one embodiment, the spin profiles are stored on a hard drive, flash memory or other solid-state, non-volatile memory such as, but not limited to, EPROM, EEPROM, or DRAM. In another embodiment, the spin profiles are contained in the RCU software. In yet another embodiment, the game controller 22, RCU 20, or other gaming machine component calculates the desired spin profile.

As shown in FIG. 1, the RCU 20 is in communication with the game controller 22. The game controller 22 is a combination of hardware and software components that supports the game for a gaming machine or a group of gaming machines. The game controller 22 is configured to support the game and may be responsible for the various functions of the gaming machine, such as, but not limited to, monitoring coin-in, coin-out, or credit meters, and awarding any prize(s) based upon the game result. The game controller 22 also generates the game outcome (i.e., the final stopping position for each reel) and is responsible for determining the desired spin duration for each reel 12. As those skilled in the art will appreciate, any of these functions may be separated into different or logical units and do not have to exist in a single controller unit.

In one embodiment, the game controller 22 includes a random number generator 24 that determines a game outcome, wherein the game outcome is a combination of indicia. In alternate embodiments, the game controller 22 may use a pseudo-random number generator or a weighted random number generator to determine the game outcome. In yet another embodiment, the random number generator 24 (or pseudo-random number generator or weighted random number generator) is a separate component in communication with the game controller 22.

As shown in FIG. 1, the RCU 20 and the game controller 22 are separate components located within the gaming machine 10. As those skilled in the art will appreciate, the RCU 20 may be interconnected to the game controller 22 by a USB connection, a wireless network connection, or any other means for operatively coupling components together. In an alternate embodiment, the RCU 20 and the game controller 22 are integral components (not shown). In yet another embodiment, the RCU 20 and the game controller 22 may be located within the gaming machine 10, but the functions of the RCU or the game controller may be carried out at a central location (not shown), such as a network server, and communicated to each gaming machine by a local area network, wireless network, wide area network, or the like.

One of ordinary skill in the art will appreciate that not all gaming machines 10 will have all these components and may have other components in addition to, or in lieu of, those components mentioned here. Furthermore, while these components are viewed and described separately, various components may be integrated into a single unit in some embodiments.

Figure 2:
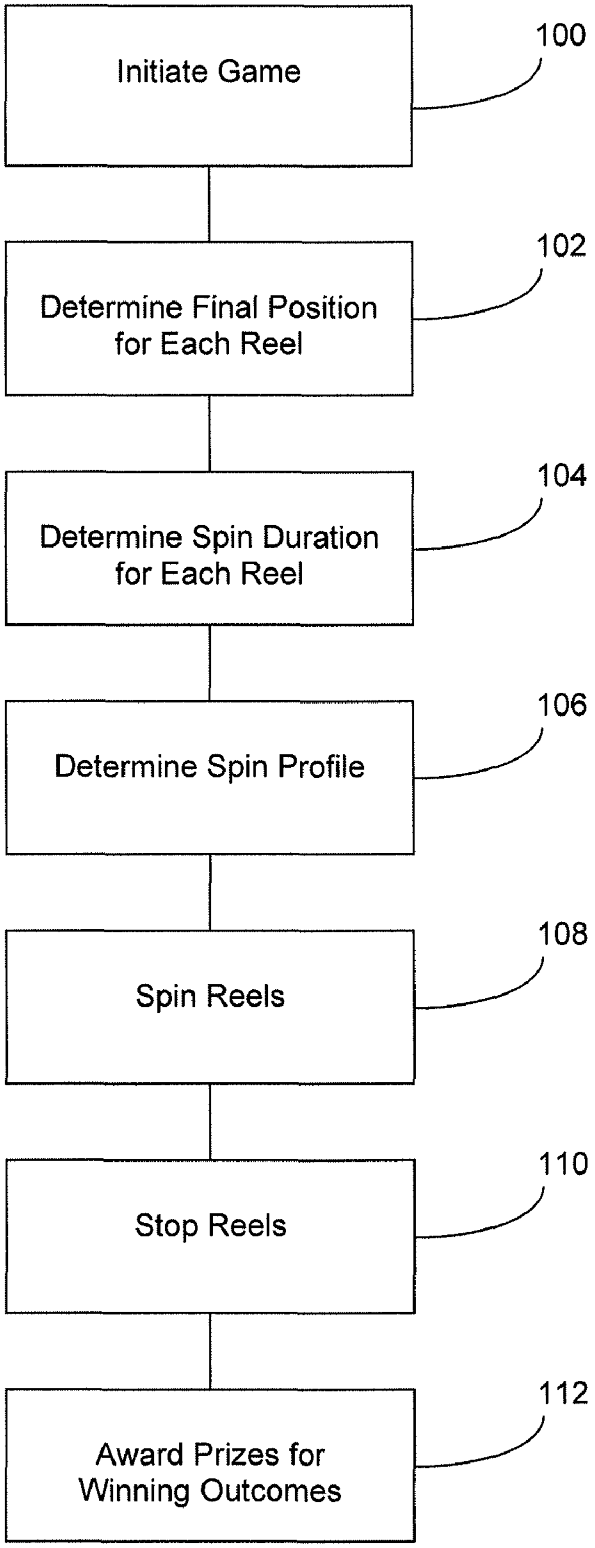
FIG. 2 is a flow diagram of one method of independently controlling each reel of a gaming machine.

In addition to the gaming machines, disclosed above, various methods of independently controlling each mechanical reel 12 in a gaming machine 10 are disclosed herein. Referring now to FIG. 2, in one method, a game player initiates a gaming session in step 100, and the game controller 22 generates a game outcome by selecting a final reel position for each of the reels 12 in step 102. The game controller 22 also selects the desired spin duration for each reel 12 in step 104. The final reel position and the desired spin duration for each reel 12 is sent to the RCU 20. In one method, in step 106, the RCU 20 then calculates the appropriate spin profile for each reel 12 based upon the spin distance (distance between the current position and desired the stop position) and the desired spin duration. That is, the RCU 20 calculates the duration of the acceleration phase, the final velocity, the duration of spinning the reel at the final velocity, and the duration of the deceleration phase. In step 108, the reels 12 are spun according to the calculated spin profile for each reel. The reels are then stopped at the final reel position in step 110. The game controller 22 then dispenses an award if the symbol combination for the reels is a winning combination in step 112.

Figure 3:
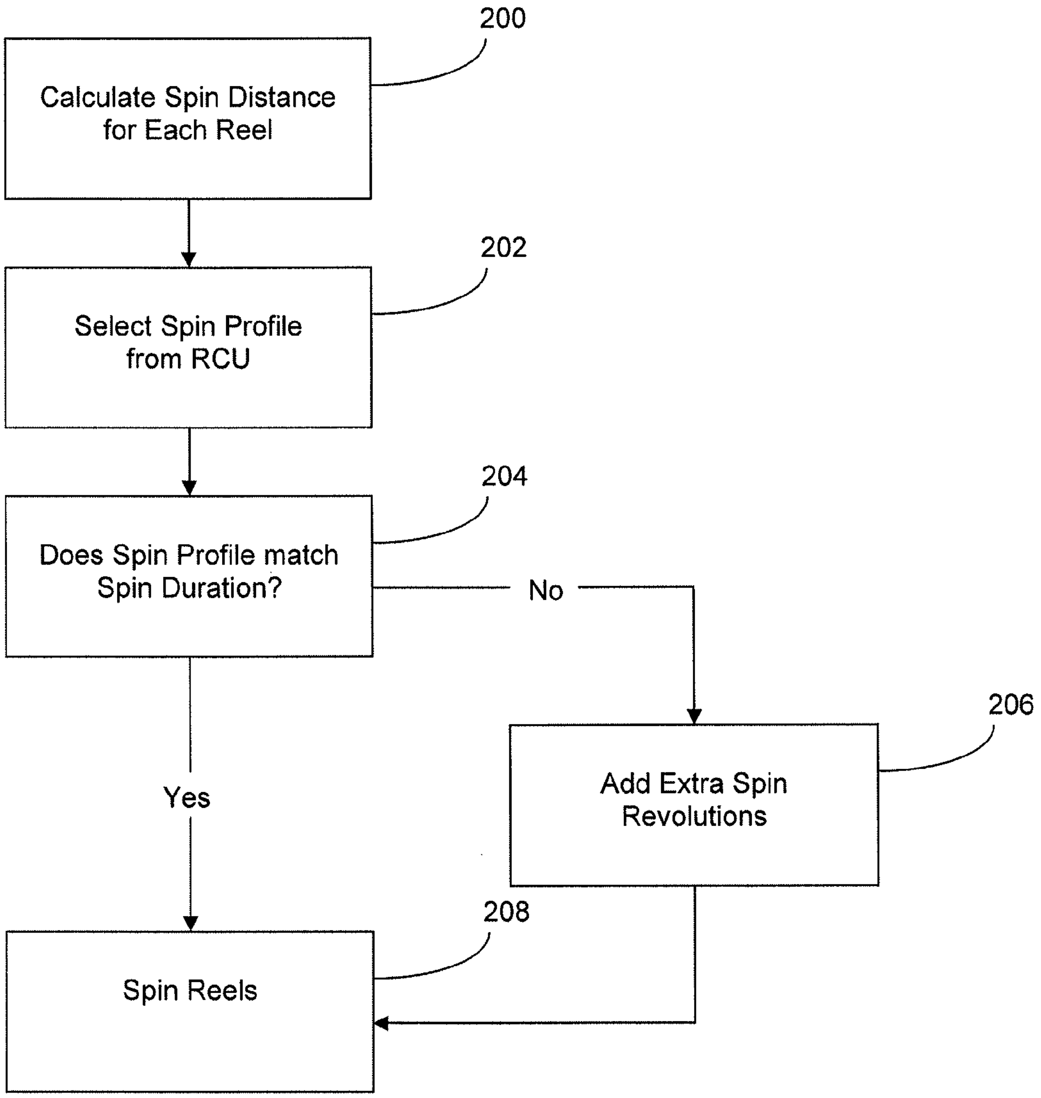
FIG. 3 is a flow diagram of one method of determining a spin profile for a reel of a gaming machine.

FIG. 3 illustrates another method of determining a spin profile for each reel 12. Once the RCU 20 calculates the appropriate spin distance for each reel 12 in step 200, then the RCU selects an appropriate spin profile from a plurality of spin profiles already stored in the RCU in step 202. The selected spin profile is the particular spin profile that will most accurately cover the required spin distance in the desired amount of time. The RCU 20 then determines if the spin duration of the selected spin profile matches the desired spin duration for the reel 12 in step 204. If the spin profile does not match the parameters of the calculated spin profile for the reel 12, the RCU 20 may add an adjustment phase to the spin profile in step 206. The adjustment phase may add extra reel rotations until the spin duration approximates the desired spin duration. Otherwise, the reels 12 are spun in step 208 and the game controller dispenses an award if the symbol combination for the reels is a winning combination.

In another method, the process for selecting the best spin profile to cover the required spin distance in the allotted time period is as follows: (1) the RCU 20 receives final reel positions for each reel and a desired spin duration for each reel; (2) the RCU calculates the distance, in steps, between the current reel position and the final reel position; (3) the RCU then determines the time required to move the reel the calculated distance at full speed by multiplying the calculated distance (i.e., the number of steps) by the step duration at a final reel velocity; (4) the RCU determines the time required to turn the reel one revolution using a spin profile that includes acceleration, final velocity, and deceleration of the reel; (5) the RCU determines the time required to turn the reel one revolution at full speed (i.e., the duration of an extra revolution); (6) the RCU sums the time durations of steps (2) and (3) (i.e., the calculated spin duration); (7) the RCU compares the calculated spin duration to the desired overall spin duration; and (8) if the calculated spin duration is within one half of the time of the time duration of one full-speed revolution (i.e., time duration of step (5)), the spin duration value is stored in the RCU 20 for later comparison. Otherwise, the time duration for one full-speed revolution (i.e., time duration of step (5)) is added to the calculated spin duration (i.e., the result from step (6)) until the calculated spin duration is within one half of the time duration of one full-speed revolution. This process is repeated for each spin profile stored in the RCU 20 until the RCU determines the spin profile that provides a spin duration that most closely matches the desired spin duration. This process is carried out for each reel 12 in the gaming machine 10 prior to spinning the reels.

In another method, a look-up table may be used to determine the spin durations. In one embodiment, the look-up table includes a list of values corresponding to the acceleration and deceleration durations. As previously mentioned, accelerating to a particular velocity comprises a plurality of motor steps having varying durations (i.e., long duration to short duration). The look-up table includes the total time to accelerate a reel to a particular final velocity (i.e., the sum of all the steps to achieve a desired final velocity). Accordingly, the RCU 20 can access the look-up table and determine the duration of the acceleration phase in lieu of calculating the duration of the acceleration phase. In one embodiment, the look-up table only includes durations for the acceleration phase because the acceleration and deceleration rates are the same (albeit in reverse directions). As a result, the acceleration and deceleration phases have the same duration. In another embodiment, the look-up table includes durations for both the acceleration and deceleration phases because the acceleration and deceleration phases have different acceleration and deceleration rates, respectively.

In the case where a particular spin duration is required, the total time duration for all the phases of the spin profile is calculated. The RCU 20 may add additional revolutions, as required, until the total spin duration approximates the desired spin duration. However, as those skilled in the art will appreciate, the exact spin duration is controllable to the time required to spin a reel one half of one revolution. For example, if the spin profile causes the reel to spin one revolution in 720 milliseconds, the accuracy of the spin profile is 360 milliseconds because the optimized spin profile may place the required reel symbol up to 180° away from the payline (i.e., desired stopping position) at the desired stop time.

In the previously discussed methods, each reel 12 spins at least one full revolution. That is, the reel 12 will spin a full revolution in addition to the distance between the current reel position and the final reel position. In another method, the reel spin profiles may be configured to allow the reels 12 to spin less than a full revolution. For example, if the difference between the current and the final reel position is ¾ of a revolution, the spin profiles may be designed to allow for a spin distance of ¾ of a revolution.

In these above-disclosed methods, the spin profiles are selected so that the stop interval between each reel spin is approximately the same duration regardless of the distance traveled by each reel. Having approximately equal stop intervals between each reel creates a rhythmic effect in that the reels stop at regular intervals. Accordingly, the rhythmic spinning is more soothing and less stressful to a game player so that a game player can play the gaming machines for a longer period of time without becoming fatigued.

Because each reel spin duration may be controlled, the spin profiles of each reel may be altered to vary the overall duration of the game. For example, the overall game duration may be increased by lengthening the spin duration of each reel by adding reel revolutions. Alternatively, the game duration may be increased by reducing the maximum velocity of the reels or by increasing the stop duration between each reel. Likewise, the game duration may be shortened by increasing the maximum velocity of the reels or decreasing the stop duration between each reel. Accordingly, the game programmer or manufacturer may be able to control the length of each game. Thus, it is possible to provide a gaming machine having more game plays in a given period of time as compared to conventional gaming machines. In another embodiment, the game player may be able to increase or decrease the game duration by activating one or more buttons or other input devices (e.g., toggle switch or slide bar) to select a game length. In yet another embodiment, the gaming machine 10 may be networked to a host network thereby allowing a casino operator to increase or decrease the game duration. Accordingly, the casino operator may be able to decrease the game duration during peak times of the day.

In another method, the reels 12 may have spin profiles where the stop intervals increase for each subsequent reel. For example, for a gaming machine having five reels, the stop duration between the first and second reels is shorter in duration as compared to other stop durations, and the stop duration between the fourth and fifth reels is the longest in duration. In another method, the reel duration increases as the game progresses when there is the potential for a particular winning combination. For example, the first reel may have a normal spin duration and stops at a "7", the second reel may spin for a longer duration if the stop position is another "7", and the third reel may spin for an even longer time regardless of the outcome. In another method, the third reel may only spin for a longer duration when the last symbol produces a winning outcome. That is, in the previous example, the third reel will only have a long spin duration if the last symbol produces a winning combination (i.e., the last symbol is a "7" or a "wild symbol"). By increasing the spin duration for subsequent reels, player anticipation builds thereby enhancing the player's enjoyment of the game. In an alternate method, the reels 12 may have spin profiles where the spin durations decrease for each subsequent reel.

In another method, the reels may have spin profiles where there is a programmed delay for subsequent reels. That is, after the first reel is spun, there is a time delay before the next reel is spun. The delay before spinning each reel may be controlled by the RCU 20. In yet another method, the reels 12 may be spun in descending order of spin duration. That is, the reel 12 with the longest spin duration is spun first and the reel with the shortest spin duration is spun last. In this method, the reels 12 may stop at the same time even though the reels have different spin durations.

In one method, the reels 12 may have spin profiles where the reels stop in sequential order. For example, in one exemplary spin profile, the reels stop sequentially from left to right. In another exemplary spin profile, the reels stop sequentially from right to left. In yet another spin profile, the reels stop in random order.

Figure 4:
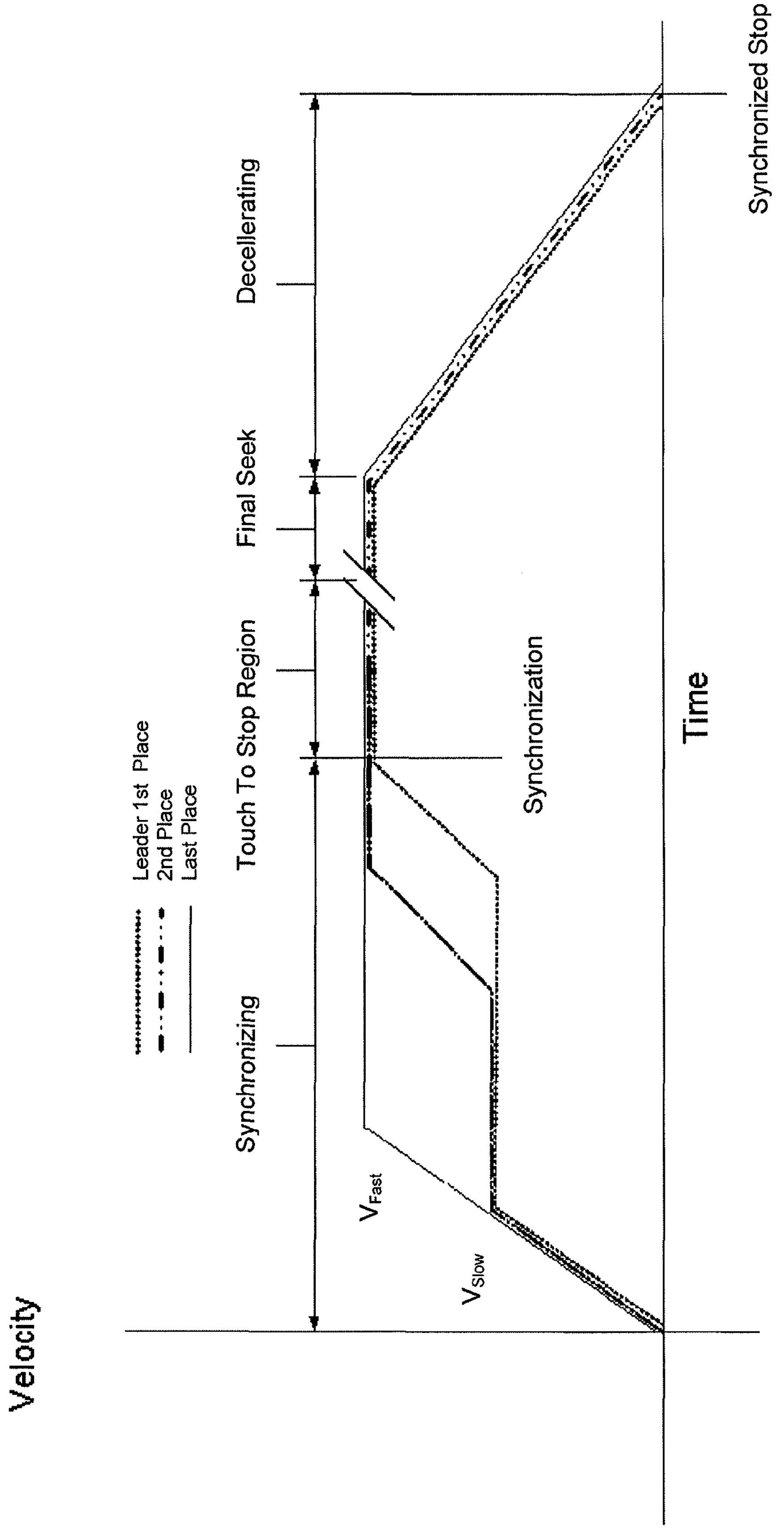
FIG. 4 graphically illustrates one method of synchronizing three reels in a gaming machine.

In another method, the reels 12 may have a spin profile that causes the reels to stop at approximately the same time. FIG. 4 graphically illustrates the synchronization of three reels 12 in gaming machine 10. According to this method, the RCU 20 determines the current and final positions of all the reels 12 and calculates the spin distance for each reel. The spin distance for each reel 12 is the distance the reel will travel from the current reel position to the final reel position. Then, the RCU 20 determines which reel has the longest spin distance. As shown in FIG. 4, the reel with the longest spin distance is labelled the "last place reel," the reel with the shortest spin distance is the "leader reel," and the reel with the intermediate distance is the "second place reel." The RCU 20 then calculates the number of steps at a slow speed for each reel 12. The number of steps at the slow speed is determined by the following formula:

$$StepsAtSlowSpeed = \frac{StepsToLastPlaceReel * V_{FAST}}{V_{SLOW} - V_{FAST}}.$$

The information for each reel is then processed by the reel driver software. The reels 12 are then spun and the acceleration and/or velocity of each reel are varied to synchronize the reels to their final positions. As shown in FIG. 4, once the reels 12 are synchronized, the game player may stop the reels by depressing a button or other player input means. In another method, once the reels 12 are synchronized, the RCU 20 stops the reels at the predetermined stop positions. Once the RCU 20 receives the stop instruction, the reels 12 are decelerated and the reels stop at substantially the same time.

As shown in FIG. 4, the leader reel and the second place reel are accelerated to an intermediate velocity. These reels are maintained at a constant intermediate velocity and then accelerated to a final velocity at a later time. In another embodiment, the leader reel and the second place reel may be slowly accelerated to slowly increase the intermediate velocity prior to accelerating the reels to their final velocities.

The previous method of synchronizing the reels, as exemplified by FIG. 4, are based upon synchronizing the reels to the reel having the longest distance to travel. In another method, the reels may be synchronized to the reel having an intermediate distance to travel (e.g., the second place reel). In this method, the second place reel is accelerated to a designated velocity. The leader reel may be accelerated to a final velocity, slower than the second place reel's final velocity, and then accelerated to the second place reel's velocity at a prescribed time. The last place reel may be accelerated to a final velocity, greater than the second place reel's final velocity, and, at a prescribed time, the last place reel is decelerated to the second place reel's velocity. Once the reels are synchronized, the reels may be stopped by the RCU or by the player.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed is:

1. A method for independently controlling the movement of each of a plurality of mechanical reels in a gaming machine, the method comprising:

activating a game on a gaming machine, the game machine having the plurality of mechanical reels including at least a first reel, a second reel, and a third reel, wherein each of the reels includes an outer edge having indicia displayed thereon;

generating a game outcome by a game controller of the gaming machine, wherein the game outcome dictates a particular final position for the first reel, second reel and third reel;

receiving player input for selecting an overall spin duration of the plurality of mechanical reels;

determining a spin profile for each of the plurality of mechanical reels based upon the game outcome and overall spin duration, wherein the spin profiles cause each of the plurality of reels to stop such that a first time interval interposed between a first stopping reel of the plurality of mechanical reels and a second stopping reel of the plurality of mechanical reels is shorter than a second time interval interposed between the second stopping reel and a third stopping reel of the plurality of mechanical reels when the game outcome is a winning outcome;

initiating spinning of the first reel, second reel, and third reel substantially at a same time, wherein the first reel, second reel, and the third reel are spun according to the corresponding spin profile; and stopping each of the first reel, second reel, and third reel at the corresponding final position according to the corresponding spin profile.

2. The method of claim 1, wherein each spin profile comprises accelerating the reel to a final velocity, maintaining the final velocity of the reel, and decelerating the reel to its stop position.

3. The method of claim 2, wherein each spin profile further comprises spinning the reel one or more additional revolutions.

4. The method of claim 1, wherein determining the spin profile for each of the plurality of mechanical reels further comprises selecting the spin profile from a database of spin profiles.

5. The method of claim 1, wherein stopping each of the first reel, second reel, and third reel further comprises stopping the reels in a sequential order.

6. The method of claim 1, wherein stopping each of the first reel, second reel, and third reel further comprises stopping the reels in a random order.

7. The method of claim 1, further comprising:
receiving player input to increase an overall spin duration of a game, wherein the overall spin duration is a sum of spin durations for each reel; and
increasing the spin duration for each of the plurality of reels for a subsequent game.

8. The method of claim 1, further comprising:
receiving player input to decrease an overall spin duration of a game, wherein the overall spin duration is a sum of spin durations for each reel; and
decreasing the spin duration for each of the plurality of reels for a subsequent game.

9. The method of claim 1, further comprising:
receiving operator input at the gaming device from a network host to decrease an overall spin duration of a game, wherein the overall spin duration is a sum of spin durations for each reel; and
decreasing the spin duration for each of the plurality of reels for a subsequent game.

10. The method of claim 1, further comprising:
receiving operator input at the gaming device from a network host to increase an overall spin duration of a game, wherein the overall spin duration is a sum of spin durations for each reel; and
increasing the spin duration for each of the plurality of reels for a subsequent game.

11. The method of claim 1, further comprising synchronizing at least one of the first stopping reel, the second stopping reel, and the third stopping reel with music.

12. The method of claim 1, wherein stopping each of the first reel, second reel, and third reel further comprises stopping the reels simultaneously without player input.

13. A method for independently controlling the movement of each of a plurality of mechanical reels in a gaming machine, the method comprising:
providing the plurality of mechanical reels, each having indicia provided on an outer surface of each of the reels;
generating a game outcome by a game controller of the gaming machine, wherein the game outcome dictates a particular final position for each of the plurality of mechanical reels;
receiving player input for selecting an overall spin duration of the plurality of mechanical reels, the overall spin duration being the sum of a spin duration of each of the mechanical reels;
independently spinning each of the plurality of mechanical reels using one or more stepper motors, wherein the one or more stepper motors are operatively coupled to the plurality of mechanical reels; and
determining a spin profile for each reel based upon the game outcome and the overall spin duration using a reel control unit, wherein the reel control unit is in communication with the one or more stepper motors and the game controller, and wherein the spin profiles cause each of the plurality of reels to stop.

14. The method of claim 13, wherein the gaming machine comprises at least three reels.

15. The method of claim 13, wherein the game controller and the reel control unit are integral components.

16. The method of claim 13, further comprising storing one or more spin profiles in a memory unit, wherein the memory unit is in communication with the reel control unit.

17. The method of claim 13, further comprising stopping the plurality of reels using a player-actuated button.

18. The method of claim 13, wherein the stopping of at least one of the plurality of reels is synchronized with music.

19. The method of claim 13, wherein the spin profile causes each of the plurality of reels to stop simultaneously without player input.

* * * * *